(12) United States Patent
Fletcher

(10) Patent No.: US 7,009,477 B2
(45) Date of Patent: Mar. 7, 2006

(54) ELECTROMAGNETIC ACTUATOR

(75) Inventor: Matthew David Fletcher, Royston (GB)

(73) Assignee: LDS Test and Measurement Inc., Yalesville, CT (US)

( * ) Notice: Subject to any disclaimer, the term of this patent is extended or adjusted under 35 U.S.C. 154(b) by 0 days.

(21) Appl. No.: 10/502,929

(22) PCT Filed: Feb. 11, 2003

(86) PCT No.: PCT/GB03/00628

§ 371 (c)(1),
(2), (4) Date: Jul. 29, 2004

(87) PCT Pub. No.: WO03/069299

PCT Pub. Date: Aug. 21, 2003

(65) Prior Publication Data

US 2005/0104697 A1 May 19, 2005

(30) Foreign Application Priority Data

Feb. 11, 2002 (GB) ................................. 0203168

(51) Int. Cl.
*H01H 7/08* (2006.01)

(52) U.S. Cl. ........................ 335/220; 310/14

(58) Field of Classification Search ........ 335/220–234, 335/246, 268–269; 310/12–15, 81
See application file for complete search history.

(56) References Cited

U.S. PATENT DOCUMENTS

| 4,669,013 A | 5/1987 | Scranton et al. ............ 360/106 |
| 4,945,269 A * | 7/1990 | Kamm ......................... 310/15 |
| 6,147,422 A | 11/2000 | Delson et al. ................ 310/14 |

FOREIGN PATENT DOCUMENTS

| EP | 0197394 | 10/1986 |
| GB | 2186121 | 8/1987 |
| JP | 60-233380 | 11/1985 |
| JP | 11-069755 | 3/1999 |
| WO | 02-037644 A3 | 5/2002 |

* cited by examiner

*Primary Examiner*—Lincoln Donovan
(74) *Attorney, Agent, or Firm*—Baker & Hostetler LLP

(57) ABSTRACT

An actuator for applying force along an axis to a body, comprising an annular body arranged along the axis, an annular magnetic field source within and substantially coaxially with the annular body, a substantially cylindrical central member arranged substantially coaxially within the annular body in a fixed relationship with a gap formed between the central member and the annular body and an armature comprising a substantially cylindrical hollow member extending at least partially into the gap between the central member and the annular body. The hollow member has first and second spaced coils positioned at either side of the magnetic field source when the armature is at rest, such that the areas of the gap in which the first and second coils are positioned are magnetic flux gaps, and the armature and the annular body are translationally relatively moveable when the first and second coils are energised with opposite currents.

10 Claims, 3 Drawing Sheets

ELECTROMAGNETIC ACTUATOR

FIELD OF THE INVENTION

The present invention relates to electromagnetic actuators for applying force along an axis to a body. The applied force may impose translation movement on the body or may counteract motion of the body. The present invention has particular application to the vibration testing of equipment, apparatus and components from various fields including the aerospace, automotive and electronics industries.

BACKGROUND OF THE INVENTION

In the field of vibration testing, electromagnetic actuators, also called shakers, are typically used in the production environment to test items at varying levels of force, velocity and displacement and over varying periods of time. Some shakers are constructed to apply low levels of force and over relatively short periods of time while others are made for more extreme conditions, such as are necessary for shock testing. To be suitable to test items under heavy loads and at very high stress levels over long continuous periods, shakers must be extremely robust and highly reliable.

An example of a known electromagnetic actuator is the applicant's existing V964, V984 and V994 models. FIG. 1 illustrates a general construction of a known actuator. The armature 1 is adapted to vibrate relative to the body or stator 2 and is suspended from the stator by suspension members 7. The armature 1 includes armature coil 4 covered in a carbon fibre sheet, which is located in an annular air gap. Two electromagnets (5,6) running in opposition are provided which generate D.C. magnetic fields across the air gap to supply the motive force. The coil 4 is energised by an alternating current so that it moves relative to the stator 2, causing the armature 1 to vibrate at the frequency of the applied alternating current. An article to be vibration tested may be placed directly on top of the armature normal to its axis of vibration, or on a work table carried by the armature. Alternatively, the article to be tested may be placed on a horizontal table coupled to the armature when horizontal vibration testing is to be carried out. An example of such horizontal vibration testing is described in U.S. Pat. No. 4,489,612.

While this arrangement is generally suitable for many applications, there are problems with its overall structure and operation.

In many instances of vibration testing, pure vertical acceleration is required, with no, or at least minimal, rotational force. This is particularly the case when testing apparatus that are sensitive to rotational forces, such as gyroscopes. The armature coil is generally constructed by bonding together adjacent turns of current carrying conductors. Such conductors may be hollow to allow the passage of water for cooling purposes. The helical form of the armature coil 4 induces rotational forces. This is because, with such helical coils the current through the coil is not perpendicular to the thrust axis of the actuator, as the flux is parallel to the axis of the coil and hence of the vibrator itself. This produces a torsional force at an angle to the axis of the vibrator and which excites resonance in the coil 4. This resonance also causes rotational resonance in the armature 1, which is generally undesirable.

The size and construction of the armature illustrated in FIG. 1 is also inflexible as its size is dependent upon the size of the coil arrangement. This is because in these actuators there is a single flux gap with two field coils providing the motive force. These run in opposition to concentrate the flux. In operation the relative movement between the armature 1 and the stator 2 results in the armature breaking and disturbing the magnetic fields generated between the magnets. FIG. 3A illustrates the magnetic field lines of the actuator shown in FIG. 1. As can be seen from FIG. 3A, the magnetic fields in this arrangement are quite complex and there is much competition for space in the magnetic circuit. In order to minimise the disturbance to the fields, the armature structure has to be long and webbed. As the armature structure undergoes large stresses, it is generally desirable to have flexibility in designing its construction in order to optimise its performance.

Another problem with such electromagnetic actuators is the location of the electrical and coolant connections and armature bearings of the structure. FIG. 1 shows the centrally located bearing 8, which allows movement of the armature along its vibratory axis. The electrical/cooling connector for the coil is shown in FIG. 3A at 27a, and a corresponding electrical/cooling connector 28a is located on an upper edge of the coil. These connections are therefore also located within the body of the actuator. Particularly for maintenance purposes, the positioning of these components within the actuator body, while necessary in view of the structure of the actuator, means that it is necessary to at least partially dismantle the actuator to obtain access to the components, which can be a time-consuming operation.

SUMMARY OF THE INVENTION

Another feature of existing vibration assemblies is that the armature is generally fitted to a central assembly via a shaft 9 and bearing 8 arrangement, with the shaft fitted to the armature. This prior arrangement requires a separate air seal 11 at the head of the shaft on the top of the armature body. This seal is normally provided by a flexible rubberised cloth. However, such a flexible seal is subject to wear problems.

It is therefore an object of this invention to provide an electromagnetic actuator of improved construction.

It is another object of this invention to overcome or alleviate at least one problem of the prior art.

According to one aspect the present invention provides an actuator for applying force along an axis to a body, comprising an annular body arranged along the axis; an annular magnetic field source within and substantially coaxially with the annular body, a substantially cylindrical central member arranged substantially coaxially within the annular body in a fixed relationship with a gap formed between the central member and the annular body; and an armature comprising a substantially cylindrical hollow member extending at least partially into the gap between the central member and the annular body, wherein the hollow member has first and second spaced coils positioned at either side of the magnetic field source when the armature is at rest, such that the areas of the gap in which the first and second coils are positioned are magnetic flux gaps, and the armature and the annular body are translationally relatively moveable when the first and second coils are energised with opposite currents. According to another aspect the present invention provides an actuator for applying force to a body along an axis comprising an annular body arranged along the axis and carrying a magnetic field source arrangement; a substantially cylindrical central member arranged substantially coaxially within the annular body with a gap formed between the central member and the annular body; an armature comprising a substantially cylindrical hollow member extending along the axis at least partially into the gap between the central member and the annular body, the hollow member carrying at least one coil arrangement in the gap; at least a portion of the extension means comprising a low friction material; a bearing portion extending from a surface of the central member and abutting the low friction material of the hollow member to form a bearing restricting lateral movement of the armature during operation and also forming an air seal between the cavity of the armature and the central assembly portion.

According to a further aspect, the present invention provides an actuator for generating a force in a linear direction, the actuator comprising a hollow body housing magnetic flux generating means; a core arranged concentrically in said hollow body in fixed relationship thereto and forming an annular space therebetween; and armature means arranged in said annular space and carrying two coil means; wherein said magnetic flux generating means is arranged in said hollow body to lie in a position intermediate said two coil means for generating a magnetic flux path in said hollow body and said core and through said two coil means to generate said force between said hollow body and said armature when said coils are energised.

By arranging the actuator with a single magnetic field source to drive the two magnetic flux gaps a more efficient and compact coil design is achievable for a given force rating. Further, the magnetic field generated within the two flux gaps is concentrated within the actuator by the two coils, ensuring a very low stray field.

BRIEF DESCRIPTION OF THE DRAWINGS

The present invention will now be further described, by way of example, with reference to the accompanying drawings in which:

With reference to FIG. 2, the electromagnetic actuator includes a first annular steel plate 30 and a second annular steel plate 31 with a recess in which a D.C. magnetic field source 20 is located. This D.C. magnetic field source can be an electromagnet or a permanent magnet. The second annular body 31 is secured to the first annular plate by pins 32 located circumferentially adjacent the outer edge of the plates. Preferably the pins, screws or other attachment means are equi-spaced, and any number of such attachment means in practice may be used. A third annular plate assembly 33 is atop the second plate and secured thereto by attachments 34 placed circumferentially adjacent the outer edge of the plates. These three ring-shaped plates form the stator or exterior body of the actuator. In the central portion of the stator a centre pole assembly 35 is located. The centre pole assembly is secured to the first plate assembly 30 via a base assembly block 36.

DETAILED DESCRIPTION OF THE INVENTION

Figure 1:
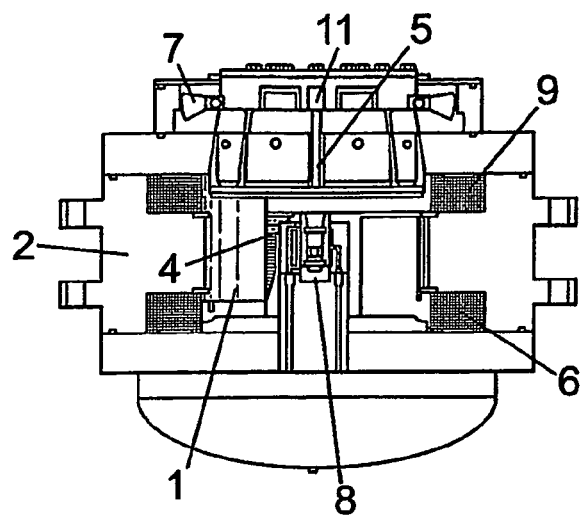
FIG. 1 illustrates a prior art electromagnetic actuator.

An air gap 22 is formed between the central surface of the annular body or stator 30, 31, 33 and the exterior surface of the centre pole assembly 35. Within the air gap 22 are two armature coils 23 and 24 carried by the armature 25 on a substantially cylindrical hollow portion and which are separated by a spacer 26. The spacer, is made of a non-magnetic and non-conductive material so that it does not induce current. For example, brimoco may be used.

The first and third plate assemblies have compensating rings 40, 41 on their inner surfaces, which are adjacent the armature coils when the actuator is at rest. The centre pole assembly also includes corresponding compensating rings 42, 43 adjacent the armature coils when at rest. These rings are made of copper. Compensating current is induced in these rings, which enables the voltage to drive the actuator to be reduced at high frequencies.

Figure 4:
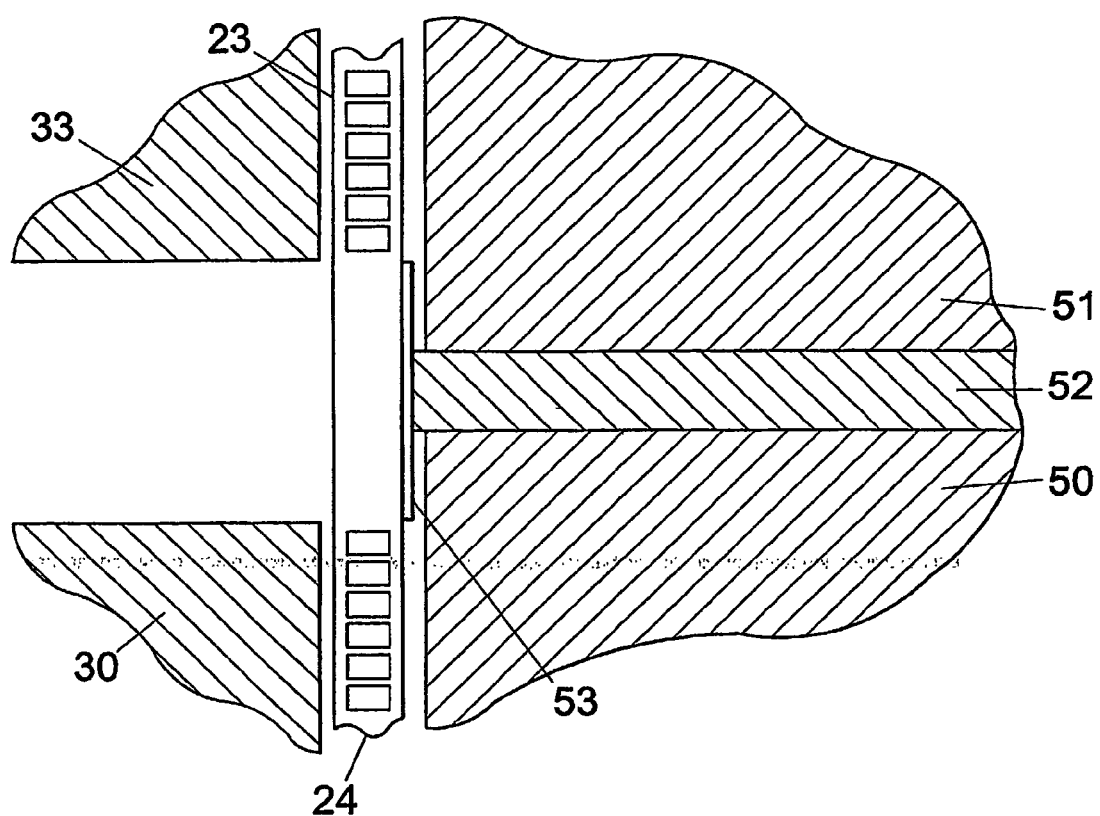
FIG. 4 illustrates a dry bearing seal according to one aspect of the invention.

The centre pole assembly is constructed from a first layer 50, a second layer 51 and a central layer 52. The three layers are preferably all steel. With reference to FIG. 4, the central steel layer 52 extends beyond the other two layers and forms a first part of the bearing restraining lateral movement of the armature. The other part of the bearing is the dry liner 53 on the spacer of the armature hollow portion. The dry liner bearing material is one having low frictional properties, such as polytetrafluoroethylene (PTFE). Rulon™ and Freelon™ are examples of suitable TFEs. Rulon is a specially compounded form of TFE fluorocarbon and other inert ingredients. It requires no lubrication and is capable of performing under extreme temperatures. It also has good wear resistance, low deformation under load and high compressive strength.

It is to be appreciated that the bearing material may be applied to the armature hollow portion in any manner, and may also form the actual spacer, as the bearing material is available as extruded rods and tubing. However, due to the high cost of fluorocarbons, tape or sheets are the preferred forms.

This arrangement additionally serves to form an air seal for the cavity between the armature cap and the central assembly. This enables the air pressure within the cavity to be controlled for load support. In this regard, assembly 66 is a position indicator controller which via an optical target is able to detect differences in the position of the armature. To compensate for any critical position changes the controller alters the air pressure within the cavity, via a slow response. The FIG. 1 arrangement therefore does not require a shaft and flexible air, seal as per previous arrangements. Since a shaft is not required, the mass of the armature can also be reduced.

The armature is suspended over the stator by a plurality of peripheral suspension members 44 which centre the armature coils in the air gap and allow free movement along its axis of vibration. The suspension members also impose a resistance to any relative lateral movement of the armature normal to its axis of vibration. The suspension members may be of any suitable construction and are preferably made up of four or five pairs of equi-spaced members around the circumference of the armature.

Figure 2:
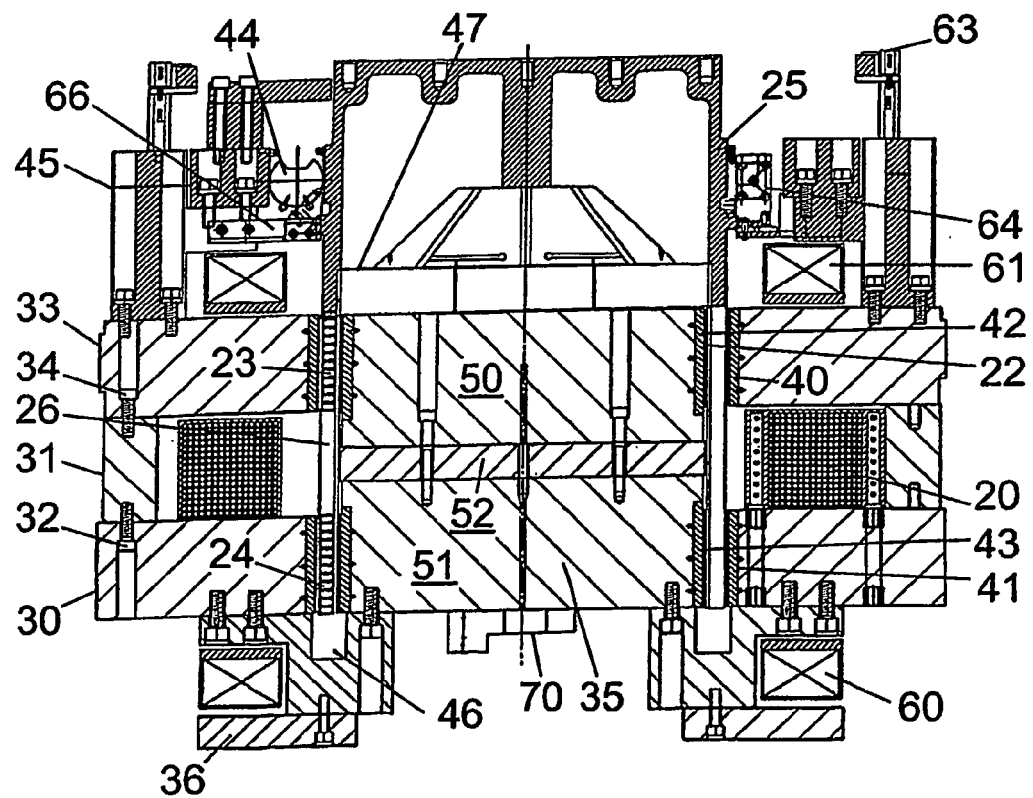
FIG. 2 illustrates an electromagnetic actuator according to an embodiment of the invention.

In FIG. 2 the suspension members are flexible roller members which comprise an arcuate surface which has one end attached to the exterior surface of the armature and to a suspension assembly component 45 at the other end. During relative axial motion between the suspension assembly component and the armature, the arcuate surface flexes and rolls.

The armature will vibrate upon energisation of the armature coils 23, 24 by equal and opposite alternating currents. This energisation causes relative translation motion between the armature 25 and the stator along the armature's longitudinal axis at the frequency of the alternating current applied to the coils 23, 24. The base assembly 36 includes a ring-shaped recess 46 approximately the width of the air gap, for receiving the displaced armature hollow portion during operation. In FIG. 2, the hollow portion of the armature incorporating the two coils and spacer are depicted at rest.

Figure 3A:
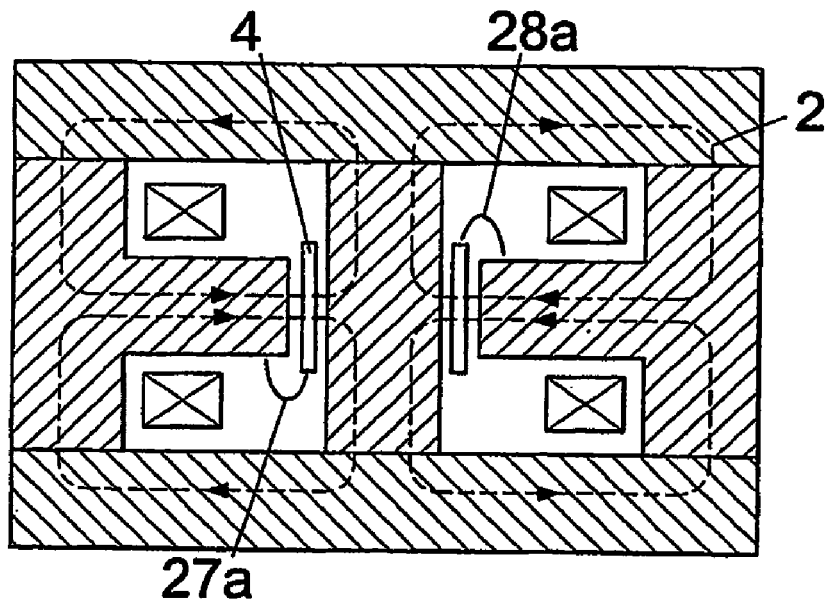
FIG. 3A illustrates the magnetic field lines according to the prior art electromagnetic actuator of FIG. 1.
Figure 3B:
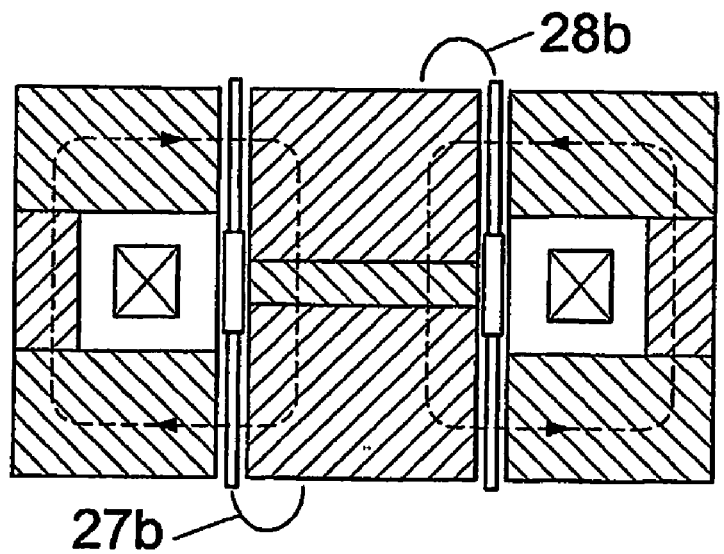
FIG. 3B illustrates the magnetic field lines according to the electromagnetic vibration generate of FIG. 2.

FIGS. 3A and 3B respectively illustrate the magnetic fields that are generated by the prior art two electromagnets/single coil arrangement and those generated by the arrangement of the present invention of single electromagnet/two coils. In the FIG. 3A arrangement the four separate fields are shown, which compete for space in the stator body. By comparison, in FIG. 3B, a more compact arrangement is achieved with only two separate field arrangements. In the FIG. 3B arrangement, there are two magnetic field gaps, one either side of the magnetic field source. The field that is generated by this arrangement is sturdy and has a higher degree of efficiency than that in FIG. 3A.

The arrangement also allows higher velocities to be achieved without the saturation effect occurring. This is because it is possible to make the armature coils longer than before. This longer length means that the gap flux can be lower, as there are more coil turns within the gap. Hence, with lower gap flux, higher velocities can be achieved with the same applied voltage. A maximum velocity of about 3.2 m/s is achievable with the actuator of FIG. 2 when the armature mass is 48 kg. By comparison, the actuator of FIG. 1 can only achieve a maximum velocity of 2 m/s.

The coil arrangement in FIG. 3B also has the effect of minimising torsional forces as the rotation forces generated in each coil will be equal and opposite, since the coils are running in opposition, and hence will cancel each other out.

The coil design of FIG. 3B allows the armature structure to be of any shape as there is minimal disturbance of the magnetic fields by the relative motion of the armature with the stator body. Hence the dependency between the armature size and shape and the coil arrangement is minimal. This is quite important, as in the design of armatures it is desirable to achieve a maximum possible thrust for a given size machine. In this regard the armature is not constrained to the radial web design, but could be of any other suitable construction, such as a tin can shape or even solid.

The coil design also allows the armature to be made lighter in weight for a similar force rating. In this regard, when the armature mass is 48 kg in an electromagnetic actuator such as that shown in FIG. 2, a Sine Force and Random Force of approximately 100 kN continuous can be achieved. By comparison, in an electromagnetic actuator as shown in FIG. 1, a force of only 89 kN is achievable with an armature mass of 59 kg, and even then that force is not continuous.

A further advantage of the coil arrangement of FIG. 2 is that displacements can be increased with the same size body as there are fewer physical constraints. In this regard, referring to FIG. 2, the physical constraints on the movement of the armature are the depth of the ring-shaped recess 46, which receives the armature hollow portion, and the radial ribs 47 in the armature body, which would abut the top layer of the centre assembly 35 when at its maximum downward displacement. A maximum displacement of 75 mm (peak-to-peak) for shock testing is achievable with the actuator design of FIG. 2 when the armature mass is 48 kg. By comparison, the actuator of FIG. 1 can only achieve a maximum displacement of 50.8 mm (peak-to-peak).

A still further advantage of the arrangement in FIG. 2 is that the bottom of the coil is visible, or at least readily accessible, so maintenance is more easily carried out as compared with previous actuators.

The arrangement of FIG. 3B also allows the armature to be removed without having to dismantle the whole machine. This is achieved by disconnecting the roller mountings 44 and the top and bottom lead-out junction terminals (27*b*, 28*b*), which are evident in FIG. 3B. The armature can then be pulled out. In this manner the armature in the actuator of FIG. 2 can be replaced fairly simply. In previous arrangements, the top and bottom lead out junction terminals (27*a*, 28*a*) were not so conveniently located, as is evident in FIG. 3A. The more convenient placement of the terminals in FIG. 3B has eventuated due to the newly designed actuator, and particularly in view of the armature hollow portion extending the armature coils beyond the magnetic field source and its casing. In practice it has been found to take about an hour. This is to be compared with a whole day for an armature change on most known actuators. With reference to FIG. 3A, it is apparent that the equivalent junction terminals 27*a* and 28*a* are located within the actuator and hence are not as readily disconnectable.

The actuator of FIG. 2 also has auxiliary coils 60 and 61. The magnetic fields generated by these two coils run in opposition and push leakage back to the main coil arrangement, further concentrating the flux in the gap, ensuring a very low stray field. Hence, these coils aid in cancelling out any stray fields that emanate from the main coil arrangement. The degauss coil 63 is a further aid in this regard in that it acts to trim any stray fields virtually to zero. This is particularly important when sensitive equipment is being tested.

An overtravel assembly 64 is also provided in the actuator in FIG. 2. This assembly serves to cut off the power to the generator when the displacement of the armature is too great. It consists of a peg and wire arrangement, whereby the wire is adapted to break in the event of the peg on the armature coming into contact with it.

Actuators for use in high stress situations generate a large amount of heat, so a cooling mechanism is customarily incorporated into such apparatus. While any cooling mechanism may be incorporated, it is preferable that a liquid cooling system is utilised as they are more effective than other systems, such as air-cooled systems for example. It is particularly important for the actuator to dissipate heat safely where the payloads contain hazardous fuels or propellants. On many air-cooled shakers, temperatures can reach 150 degrees Celsius, so there is a danger that the fuels or propellants might ignite.

Preferably the liquid is de-mineralised water, although any other cooling medium may be used, such as oil or a refrigerant. In the embodiment of FIG. 2, water is passed through or around most components to keep them coil. The attachments 70 into the centre assembly are water/electricity connections. Water is fed around the assembly as required. For example, water is fed through the armature coils to keep them cool. A suitable armature has a carbon fibre back bone or spine running on the inside of the coil which is made of hollow aluminium through which the water may pass.

Variations and additions are possible within the general inventive concept as will be apparent to those skilled in the art.

It will be appreciated that the broad inventive concept of the present invention may be applied to any conventional type of actuator or vibration generator and that the exact embodiment shown is intended to be merely illustrative and not limitative. For example, the actuator can be used for active vibration control in which case the actuator is driven to apply a force to cancel vibrations in a body.

What is claimed is:

1. An actuator for generating a force in an axial direction, the actuator comprising:
   a hollow body (30, 31, 33) housing magnetic flux generating means (20);
   a core (50, 51, 52) arranged concentrically in said hollow body in fixed relationship thereto and forming an annular space (22) therebetween; and
   armature means (25) extending at least partially into said annular space and carrying two axially-spaced coil means (23, 24);
   wherein said magnetic flux generating means (20) is arranged in said hollow body to lie in a position axially intermediate said two coil means for generating a magnetic flux path in said hollow body and said core and through said two coil means to generate said force between said hollow body and said armature when said coils are energized; and
a bearing portion extending from an outer surface of the core (52); and wherein the armature means (25) comprises a low friction area (53) between the first and second coil means (23, 24);
   wherein the bearing portion abuts the low friction area of the hollow member in order to form a bearing restricting lateral movement of the armature means (25) during operation and also forming an air seal between a cavity formed by the armature and the core.

2. The actuator according to claim 1, in which the hollow body (30, 31, 33) is an annular body arranged along the axis of the core (50, 51, 52); the magnetic flux generating means is an annular magnetic field source (20) within and substantially coaxial with the annular body;
   the core is a substantially cylindrical central member, and the armature means comprises a substantially cylindrical hollow member (25).

3. The actuator of claim 2, wherein the magnetic field source is an electromagnet.

4. The actuator according to claim 2, wherein the annular body comprises:
   a first (30) and second (33) annular assembly portion of a first internal diameter, and
   a third annular assembly portion (31) having a second internal diameter wherein the third annular assembly portion (31) is positioned between the first and second annular assembly portions with the respective outer surfaces aligned, wherein the second internal diameter is greater than the first internal diameter, and wherein the magnetic field source (20) is positioned coaxially with the third annular assembly portion between the first and second annular assemblies.

5. The actuator of claim 1, wherein the low friction material is a PTFE dry liner (53) applied to an internal surface of the armature means.

6. The actuator according to claim 1, wherein the armature means further comprises a cap forming a cavity between the cap and the core, such that the bearing portion abutting the low friction material forms an air seal to create a hermetically sealed cavity for providing load support.

7. The actuator according to claim 1, wherein the core comprises:
   a first (50) and a second (51) cylindrical assembly portion of a first diameter; and a third cylindrical assembly portion (52) of a second diameter between the first and second assembly portions, the second diameter being larger than the first diameter so that the third cylindrical assembly portion projects radially beyond the first and second assembly portions and forms the bearing portion abutting the low friction material.

8. The actuator according to claim 1, further comprising first and second annular coils (60, 61) positioned along the axis at opposite ends of the coil means (23, 24) for concentrating flux in the portions of the annular space (22) occupied by the coil means.

9. The actuator according to claim 1, with further comprising a power supply for use with the actuator for applying opposite currents to the first and second spaced coil means.

10. A vibrator for applying vibrations to a body, comprising an actuator according to claim 1, wherein said armature means and said core are arranged to allow relative reciprocal movement therebetween when said force is generated therebetween, and including coupling means for coupling said armature means to said body for the application of vibrations to said body.

* * * * *